Patented Nov. 7, 1933

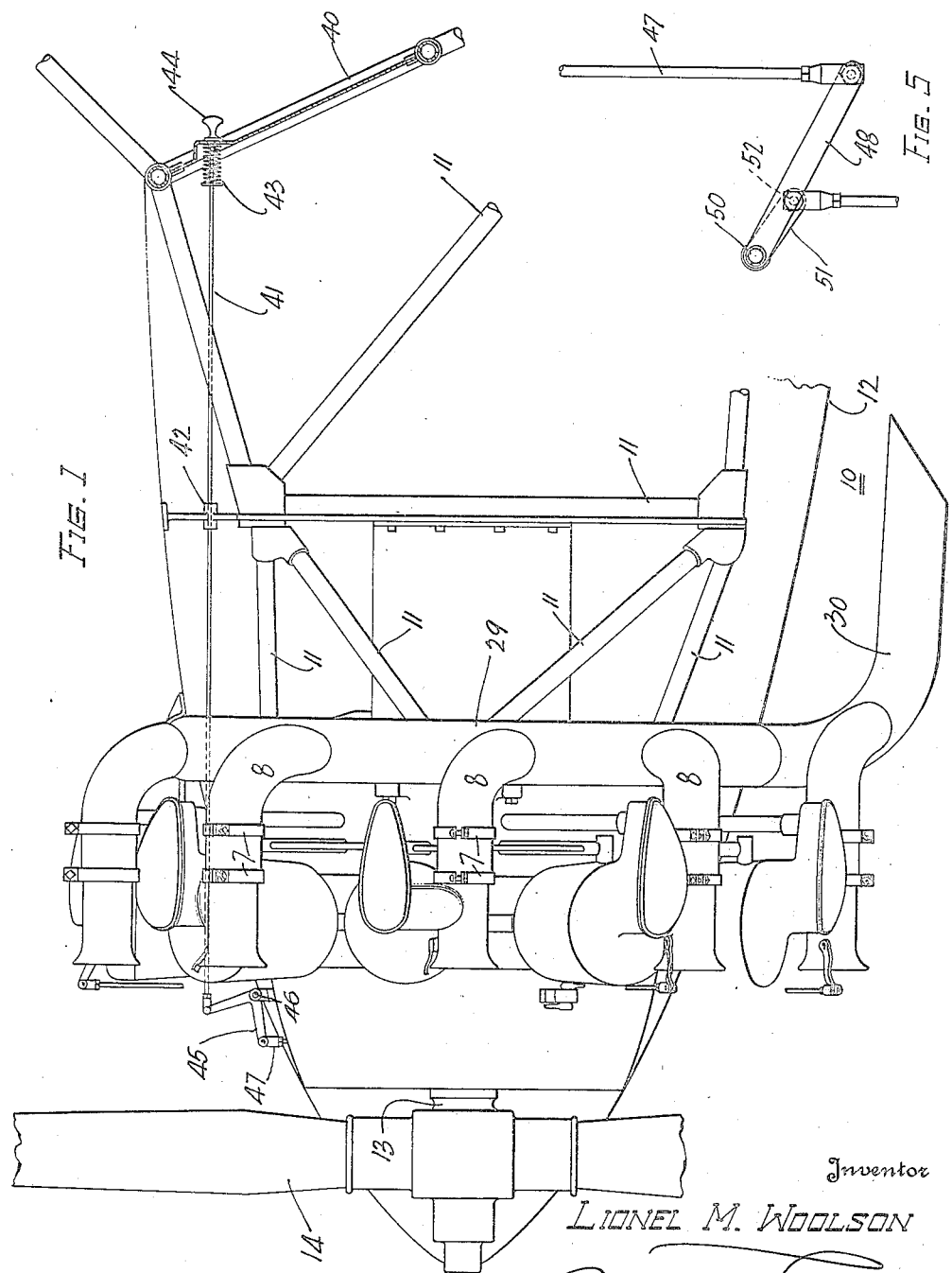

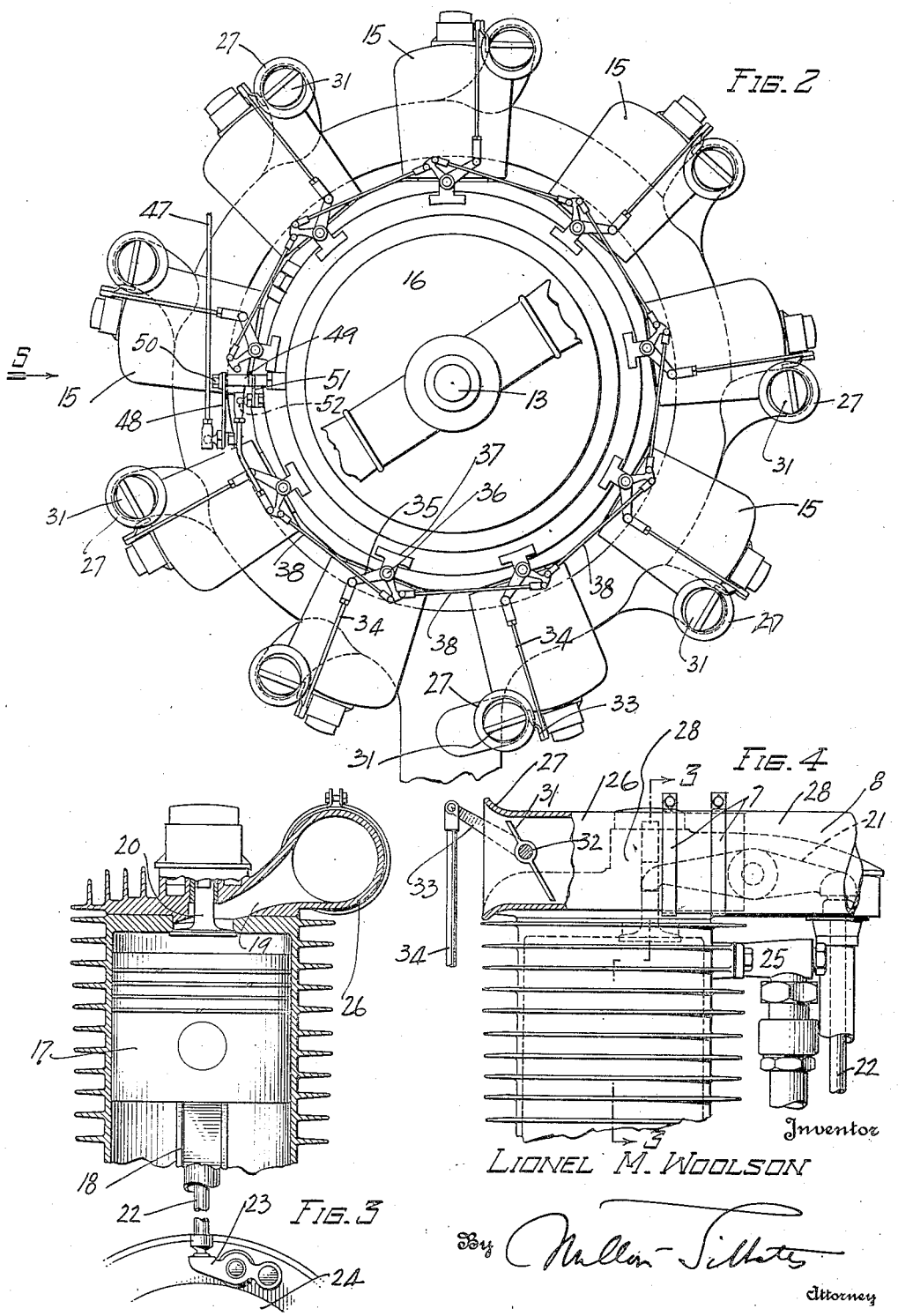

1,933,612

UNITED STATES PATENT OFFICE 1,933,612

INTERNAL COMBUSTION ENGINE

Lionel M. Woolson, Detroit, Mich., assignor to Packard Motor Car Company, Detroit, Mich., a corporation of Michigan Application June 21, 1929. Serial No. 372,570

8 Claims. (Cl. 123—79)

This invention relates to internal combustion engines, and more particularly to engines of the type in which combustion occurs through compression.

In engines of this type, starting is difficult because the cylinders are cold and heat is the essential requirement for ignition of the fuel charge; and this condition is particularly present with engines in which air is introduced directly into the cylinders as a continued cooling of the cylinders is caused, thereby. Naturally, the lower the temperature of the air, the greater this cooling effect on the cylinders is accentuated. Further, when such engines are used as the power unit for aeroplanes and the fuel is throttled down during gliding, the cooling effect of the air charge will chill the cylinders in which firing may have ceased to such an extent that renewal of the firing is seriously impaired. Such condition is a common experience with engines of this character used with aeroplanes when they ascend to high altitudes where the temperature is low.

An object of my invention is to provide mechanism for an internal combustion engine of the class described which can be regulated at will to utilize the exhaust to raise the temperature within the working chambers.

Another object of the invention is to provide a self igniting engine with control means whereby the air charge may be restricted and exhaust gases utilized to compensate for the air charge reduction.

A further object of the invention is to provide an internal combustion engine of the solid fuel injection type with a conduit structure through which air can be drawn into, or exhaust gases expelled from, a cylinder.

Another object of my invention is to provide a multi-cylinder self igniting engine with individual air inlets and a common exhaust manifold arranged and simultaneously controlled at will so that a uniform quantity of air, or a desired ratio of air and exhaust can be drawn into the several cylinders for the combustion charge.

Other objects of the invention will appear from the following description taken in connection with the drawings forming a part of this specification, in which:

Figure 1 is a side elevation of a portion of an aeroplane having an engine incorporating my invention associated in driving relation therewith, Figure 2 is a front elevation of the same, the propeller being broken away so that the valve control mechanism can be more readily seen, Figure 3 is a sectional view of one of the engine cylinders taken on line 3—3 of Figure 4, Figure 4 is a side elevation of the upper portion of one of the cylinders, the air inlet and exhaust conduit being shown partially in section to illustrate the air control valve, and Figure 5 is a side elevation of a portion of the control mechanism as indicated by the arrow in Figure 2.

Referring now to the drawings by characters of reference, 10 illustrates the forward end of a conventional form of aeroplane including a plurality of struts 11 exteriorly of which there is the usual outer cover panel 12. A radial type of internal combustion engine is secured to the forward ends of the front struts 11 and a crank-shaft 13 extends forwardly from the internal combustion engine and is connected to drive a propeller 14.

The internal combustion engine illustrated is of the nine-cylinder radial type, and as all of the cylinders are similar a description of one will suffice. The cylinders 15 are secured to the central casing 16 in a suitable manner such as illustrated in my Patent No. 1,852,498, issued April 5, 1932, and each cylinder is provided with a piston 17 having a connecting rod 18 extending to and arranged to drive the shaft 13. A passage 19 extends through the head of the cylinder at an angle to the axis thereof and tangentially with respect to the cylinder, such passage being in the form illustrated in Patent No. 1,662,106 issued March 13, 1928. There is a valve 20 which controls the passage 19 at the interior end thereof, and such passage provides an inlet for the air and an outlet for the exhaust. It will be understood, however, that a separate inlet and exhaust passage could be used. The valve 20 is operated by the rocker arm 21, and such rocker arm is reciprocated by the rod 22 which extends parallel to the cylinder and into the casing where it is actuated by a rock lever 23 operated by a cam 24 rotating with the crank shaft. The rocker arm 21 extends into a slot in the stem of the valve 20 and the cam operating mechanism is arranged so that the valve will be in position opening the passage 19 to the interior of the cylinder during the suction stroke and the exhaust stroke, it being understood that the engine illustrated is of the four-cycle type. A nozzle 25 extends through the wall of the cylinder and is connected so that liquid fuel is sprayed into the working chamber during a portion of the compression stroke of the piston, such fuel nozzle and pump structure being of a conventional form which will introduce the fuel in a finely divided condition into the working chamber. It will be seen that the engine described is of the Diesel type, in which air and fuel are introduced separately and directly into the working chamber of the cylinder wherein they are mixed to form a fuel charge, the combustion of which takes place due to the heat developed within the working chamber on the compression stroke of the piston.

The invention is associated with the type of engine described for the purpose of raising the temperature within the cylinders to assist starting of the engine or bringing in of cylinders in which firing has ceased.

A conduit 26 is arranged transversely of and at the end of the passage 19 and its forward end 27 is open in the direction in which the engine is adapted to move. A conduit 8 is secured to the rear end 28 of this conduit by clamps 7 and extends to and is integral with a circular exhaust manifold 29 having a rearwardly extending outlet 30 which is open to atmosphere. A butterfly valve 31 is arranged interiorly and adjacent the inlet end of the conduit 26 and is pivotally mounted upon a shaft 32 which extends transversely through and is secured to the conduit member. An arm 33 is connected to the shaft 32 for rotating the butterfly valve, and a rod 34 is pivotally connected to the arm 33 for rocking the same. The rod 34 extends axially in relation to the cylinder and is pivotally connected at its inner end to one end of the bell crank lever 35 which is pivotally carried by a shaft 36 by the bracket 37 which is secured to the engine casing. The other end of the bell crank lever 35 has pivotally connected thereto link members 38 which extend to and are pivotally connected to the bell crank lever associated with the valve operating mechanism of the adjacent cylinders. It will be seen that by moving the connecting link members 38 in a circular direction that the bell crank levers 35 can be rocked to simultaneously move the valves 31 for opening and closing the air inlet end of the conduits 26 so that in this manner the quantity of air admitted to the working chambers can be regulated at the will of the aeroplane pilot.

A mechanism for rotating such valve operating mechanism is arranged to extend so that it can be manipulated from the cock pit 40. Such mechanism includes a control rod 41 which extends rearwardly between a pair of cylinders through a bearing 42 to the cock pit and a knob 44 is secured to the end of the rod 41 so that the pilot can conveniently reciprocate the control rod, a spring 43 being arranged to normally maintain the mechanism in position so that the valves are wide open. The forward end of the control rod is pivotally connected to a bell crank lever 45 which rocks upon a pin 46 secured to the forwardly extending portion of the engine casing. A rod 47 is pivotally connected to the other arm of the bell crank lever 45 and extends downwardly in a vertical plane and is pivotally connected to an arm 48 which extends from the sleeve 49 which is pivotally mounted upon a shaft 50 extending from the forwardly extending portion of the engine casing. Another arm 51 extends from the sleeve 49 and is provided with a ball end 52 and pivotally engages with one of the links 38, such link is not attached to the bell crank 35 of the adjacent mechanism. When the pilot pulls the control rod 41, the connected mechanism leading to the several valves will be moved simultaneously and reduce the quantity of air which is allowed to pass through the open end of the conduits 26 and into the working chamber during a suction stroke of the several cylinders. As the supply of air is decreased through regulation of the valves 31, the passage 19, being open to the exhaust manifold, will draw in from the manifold a supply of exhaust gas and air sufficient to compensate for the required air charge which has been reduced.

As the exhaust is hot, the temperature of the air charges is materially raised and consequently the temperature within the cylinder is also raised. It will be seen that by thus raising the temperature within the cylinders the combustion of the fuel mixture will be assisted and the ignition in cylinders occurs more readily so that there is less likelihood of missing explosions when idling. During starting, explosion in any one of the cylinders will provide exhaust which is drawn into cylinders not firing and thus raising the temperature therein and assisting in a quicker starting after the first explosions.

Various changes can be made in the details of the construction described without departing from the spirit of my invention and the scope of which I claim.

What I claim is:

1. In an internal combustion engine, a cylinder having a common port for the intake of air and the discharge of exhaust, an air inlet conduit leading to the port, an exhaust manifold connected in open communication with the port, and valve means in the air inlet conduit for varying at will the quantity of air introduced into the cylinder.

2. In an internal combustion engine, a cylinder having a port leading into the interior thereof, a piston reciprocable in the cylinder, a conduit communicating with the port in the cylinder, said conduit having an air inlet end and an exhaust end, and a valve controlling the inlet end of the conduit for regulating the quantity of air drawn into the cylinder, said conduit being otherwise open to atmosphere.

3. In an internal combustion engine, a plurality of cylinders, air inlet conduits leading to each cylinder, an exhaust manifold connected to the cylinders and in open communication therewith during the exhaust and intake strokes, a valve controlling the passage of air through each of the air inlet conduits, and mechanism for simultaneously actuating the valves at will.

4. In an internal combustion engine, a cylinder having a common port for the admission of air and the discharge of exhaust gas, a conduit communicating intermediate its ends with the cylinder port, said conduit being open to atmosphere at each end and one end serving as the main air inlet and the other end as the exhaust outlet, and a manually controllable butterfly valve in said conduit intermediate the main air inlet end thereof and the cylinder port, and means operable to rotate said valve and thereby regulate the quantity of air passing into the conduit.

5. In an internal combustion engine, a plurality of cylinders each having a common port for the admission of air and the discharge of exhaust gas, a conduit secured to each cylinder, each of said conduits communicating intermediate its ends with the port in the associated cylinder, a manifold open to atmosphere communicating with the rear end of the conduits, the front end of the conduits being open to atmosphere, a valve in each conduit intermediate the inlet end thereof and the associated cylinder port, and control means for simultaneously regulating the position of said valves.

6. In an internal combustion engine, a plurality of cylinders each having a common port for the admission of air and the discharge of exhaust gas, a conduit secured to each cylinder having one end serving as the main air inlet and the other end serving as the exhaust outlet, each of said conduits communicating intermediate its ends with the port in the associated cylinder, an exhaust manifold open to atmosphere communicating with the exhaust end of each conduit, a valve in the inlet end of each conduit, spring means associated to normally open said valves, link mechanism associated to actuate said valves, and manually operable means for moving said link mechanism to cause closing movement of the valves.

7. In an internal combustion engine, a plurality of cylinders each having a common port for the admission of air and the discharge of exhaust gas, a conduit secured to each cylinder, each of said conduits communicating intermediate its ends with the port in the associated cylinders, a valve in each conduit between the port and the inlet end, connected link mechanism associated with said valves for actuating the same, a rod for actuating the link mechanism, and spring means associated with the rod for normally maintaining the rod and link mechanism in a position such that the valves are fully open, manual movement of the rod in a direction opposed to the spring pressure effecting the link mechanism to cause a closing movement of said valves.

8. In an internal combustion engine, a cylinder having a common port for the admission of air and the discharge of gas, a conduit communicating intermediate its ends with the cylinder port, said conduit being open to atmosphere at each end and one end serving as the air inlet and the other end serving as the exhaust outlet, a valve in the conduit intermediate the port and the air inlet end thereof for restricting the quantity of air drawn through the conduit into the port, and means for regulating the position of said valve.

LIONEL M. WOOLSON.